(12) United States Patent
Seko et al.

(10) Patent No.: US 6,377,231 B2
(45) Date of Patent: *Apr. 23, 2002

(54) IMAGE-CASTING CONTROL METHOD FOR IMAGE DISPLAY DEVICE AND IMAGE DISPLAY DEVICE

(75) Inventors: Nobuya Seko; Yoshinori Tomihari, both of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,560

(22) Filed: Nov. 10, 1997

(30) Foreign Application Priority Data

Nov. 11, 1996 (JP) ................................................ 8-298679

(51) Int. Cl.[7] .................................................. G09G 1/08
(52) U.S. Cl. ........................................ 345/13; 345/75.2
(58) Field of Search .............................. 345/74.1, 75.2, 345/76, 77, 13, 14; 315/169.1, 169.4, 381, 386, 384; 313/309

(56) References Cited

U.S. PATENT DOCUMENTS

| 3,958,152 A | * | 5/1976 | Fogg et al. ................... 315/381 |
| 5,300,862 A | * | 4/1994 | Parker et al. ................ 345/75.2 |
| 5,670,972 A | * | 9/1997 | Kim ............................... 345/13 |
| 5,801,496 A | * | 9/1998 | Takita ........................... 345/13 |

FOREIGN PATENT DOCUMENTS

| JP | 63-245178 | 10/1988 |
| JP | 3-231567 | 10/1991 |
| KR | 95-34380 | 12/1995 |
| KR | 96-15886 | 5/1998 |

* cited by examiner

*Primary Examiner*—Chanh Nguyen
(74) *Attorney, Agent, or Firm*—Sughrue Mion, PLLC

(57) ABSTRACT

An image display device incorporating a quick-action electron source is disclosed. After the power source of the device is turned on, drive signals are outputted from an RGB output circuit to each of the RGB electron sources after it is detected that sufficient deflection current is flowing from horizontal/vertical deflection circuit to the deflection yoke to enable the electron beam to adequately scan the screen.

9 Claims, 4 Drawing Sheets

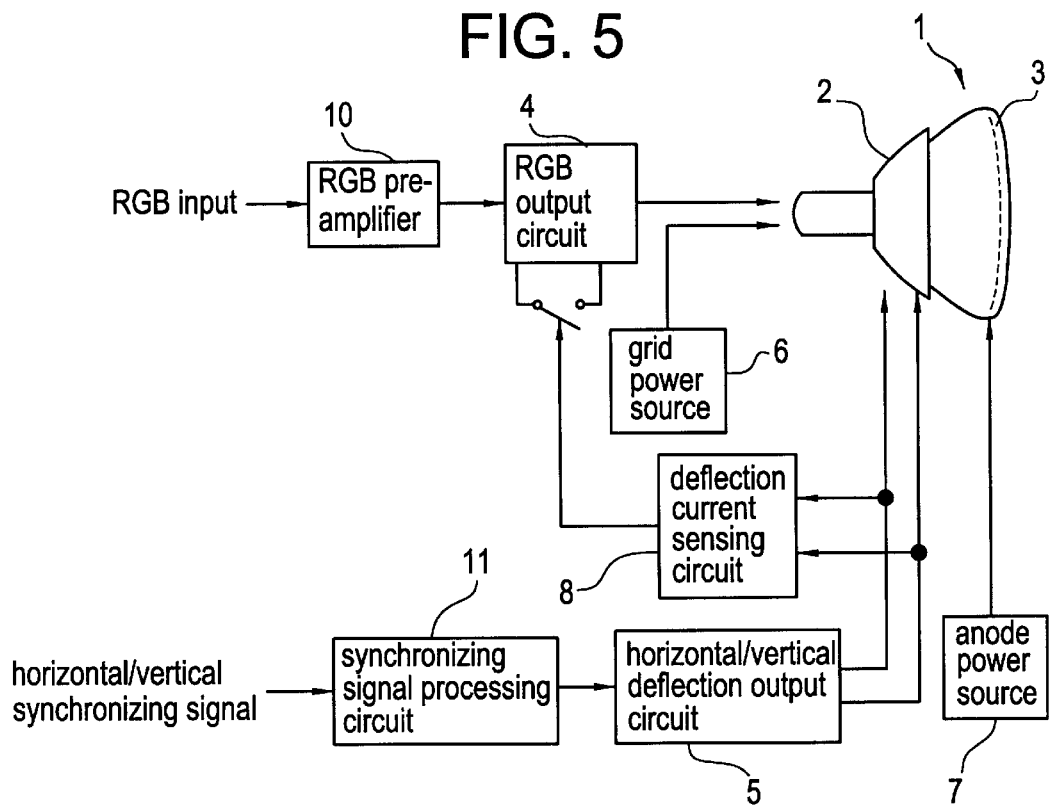
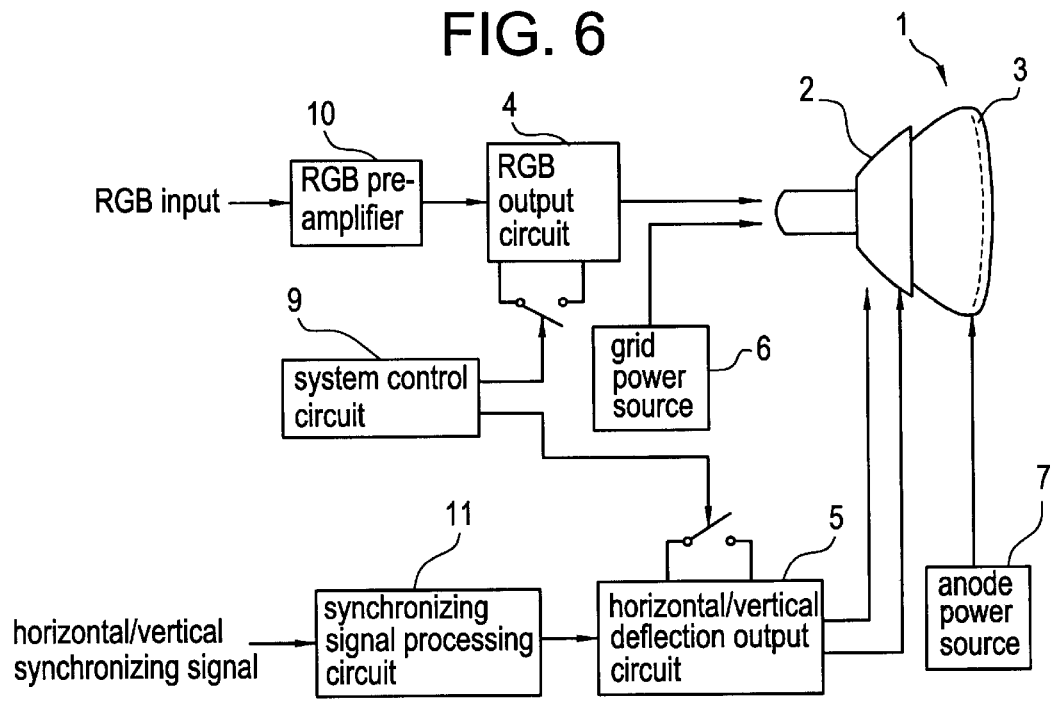

US 6,377,231 B2

IMAGE-CASTING CONTROL METHOD FOR IMAGE DISPLAY DEVICE AND IMAGE DISPLAY DEVICE

BACKGROUND OF THE INVENTION

1. Field of the Invention

The present invention relates to an image-casting control method of a cathode ray tube image display device such as for a television picture tube or data terminal device, and particularly to an image-casting control method of a cathode ray tube image display device having a cold cathode.

2. Description of the Related Art

The fundamental operation of a cathode ray tube involves the use of electron emission from electron sources, focusing, acceleration, and deflection to cause excitation of fluorescent material on a screen by electron beams and, finally, emission of light. Cathode ray tubes of the prior art use an thermionic source in the electron source that takes advantage of development through thermionic emission.

The thermionic source generally employed in a cathode ray tube obtains thermions by using a heater to heat a cathode pellet made up of oxide mixtures such as barium, calcium, and strontium. An electron gun is constructed by combining these thermionic sources and a plurality of electrodes, and various functions such as the control of the amount of electron emission as well as focusing and acceleration of the electron beam can be achieved by applying a prescribed voltage to each of the electrodes.

When a power source is turned on to operate the thermionic sources when in a halted state, about 5 seconds is necessary for the temperature of the thermionic source to increase from room temperature to a prescribed temperature (for example, about 750° C.) that allows electron emission.

Conversely, when the thermionic sources are stopped while in operation, several seconds are necessary before the temperature drops to the point at which electron emission ends (about 500° C.) even when power to the heater is cut, and thermionic are therefore emitted from the cathode during this interval, and an electron beam may be irradiated toward the screen.

In a display device using a cathode ray tube, when the power source is turned off, a high-capacity smoothing capacitor is used in the high-voltage power source that supplies a positive high voltage to the screen to stabilize the high, direct-current voltage. As a result, even though the power source is cut off, the high-voltage output is not immediately interrupted but rather, drops gradually. In comparison, horizontal and vertical deflection circuits that do not use thermions fall rapidly, and this results in a state in which the electron beam undergoes no deflection and continues to irradiate for a period of time concentrated at only the central portion of the fluorescent screen, and this state results in the problem of a remaining spot that can cause "sticking" or burning of this portion of the fluorescent screen. Several image output circuit control methods, generally referred to as "spot killers," have been disclosed as a means of avoiding this type of phenomenon after electron beam emission has reached a normal state.

As shown in FIG. 1, Japanese Patent Laid-open No. 231567/91 discloses a method of preventing a remaining spot by which capacitor 24 is charged after the power source is turned on and a steady state is achieved, and when the power source is turned off, the fall of voltage at the +B terminal is sensed, whereby spot-killer circuit 22 is activated, the voltage of charged capacitor 24 is used to change the bias of image output circuit 23 to the direction of flow of the beam current, and the high voltage charged in cathode ray tube 21 is discharged before the horizontal and vertical deflection circuits are stopped.

Japanese Patent Laid-open No. 245178/88 discloses a method for a case in which a circuit system as shown in FIG. 2 is digitized. In a case in which synchronizing deflection circuit 39 is digitized, when the power source is turned off, the fall in voltage is sensed, and system reset circuit 32 is caused to operate, whereby synchronizing deflection circuit 39 is halted instantaneously and horizontal and vertical deflection are no longer performed. To prevent this from happening, a system reset signal causes on-screen blanking transistor 33 to turn on, and this in turn causes image output transistors 35, 36, and 37 of image output circuit 34 to turn off instantaneously, whereby the cathode ray tube (not-shown) enters a blanking state in which the bias of the cathode is cut off and electron emission is halted. The electron beam can therefore be prevented from entering a static spot state. The on-screen blanking used in this case is a function used for blanking the background portion of letters displayed on the screen.

A cathode ray tube that employs a cold cathode such as a field emission cold cathode, which is a quick-acting electron source, as the electron source can dispense with the heating of the cathode by a heater, which is required in a hot cathode. The principle of electron emission in a field emission cold cathode is the emission of electrons from a solid to a vacuum brought about by a quantum-mechanical tunnel effect when a strong field of $10^7$ V/cm or more is impressed to a solid surface.

FIG. 3 shows one example of the structure of a field emission cold cathode. A high field can be obtained by applied voltage between a sharp needle-like emitter cathode 15 having a tip radius on the order of 100 nm and gate electrode 14 arranged approximately 0.5 to 1 μm away from the emitter, thereby creating field concentration at the tip of emitter electrode 15. A multiplicity of emitter-gate constructions of this type formed on a substrate 12 and connected in parallel can be used to lower the applied voltage so as to obtain a prescribed current.

The degree of sharpness of the tip of emitter electrode 15 and the isolation characteristic between emitter electrode 15 and gate electrode 14 are key conditions for maintaining the electron emission characteristic of a field emission cold cathode.

As described hereinabove, the size of each emitter and gate is extremely small, and a large number of structures can be integrated in a small area. As shown in FIG. 4, one example of the electron emission characteristic with respect to the applied voltage shows that electron emission starts from approximately 30 V and rises sharply.

However, the above-described prior art has the following problems. First, when power is turned on to a display device using a cathode ray tube that employs a quick-acting electron source such as a field emission cold cathode, the electron beam irradiates only the center of the screen, thereby causing burning of the fluorescent screen. The reason for this is that electron emission in a field emission cold cathode begins immediately upon applying voltage that meets prescribed electron emission conditions. When the power source of the device is turned on, electron emission thus begins before the horizontal and vertical deflection circuits have risen sufficiently, whereby the electron beam irradiates the center of the screen without undergoing deflection.

The second problem is the destruction of element structures caused by sputtering resulting from the bombardment of positive ions and the degrading of isolation characteristics caused by re-adhesion of sputtered particles. The electron beam ionizes residual gas molecules or gas molecules generated by irradiation of the screen within the cathode ray tube, and positive ions thereby generated are accelerated in the direction opposite that of the electron beam. When the electron beam is being deflected in a stationary state, the paths of electrons and positive ions differ due to their difference in mass, and the positive ions therefore do not reach the electron source, but when the electron beam is directed straight ahead without being deflected, the positive ions bombard the electron source. As shown in FIG. 3, a field emission cold cathode involves-the input of voltage to a minute structure, and a field emission cold cathode is therefore extremely sensitive to bombardment by positive ions.

SUMMARY OF THE INVENTION

It is an object of the present invention to provide a method and device for preventing a remaining spot when power is turned on in an image display device incorporating a quick-acting electron source.

It is another object of the present invention to provide a method and device for improving the reliability and life of an image display device by preventing concentrated positive ion bombardment of the cathode in a device incorporating a quick-acting electron source.

The image-casting control method of the image display device of the present invention consists in delaying the start of operation of the electron source when the power source is turned on until the electron beam deflection system attains a steady operating state.

According to the present invention, in an image display device incorporating a quick-action electron source such as a field emission cold cathode, after the power source of the device is turned on, electron emission does not start until after the horizontal/vertical deflection circuit has risen sufficiently, thereby preventing burning of the fluorescent screen when the power source is turned on.

According to the present invention, despite ionization of gas molecules inside a cathode ray tube by the electron beam and generation of positive ions, the electron beam is deflected and the electrons and positive ions therefore have differing paths due to their difference in mass, and positive ions for the most part do not reach-the electron source, thereby allowing suppression of both damage to the element structures caused by sputtering due to bombardment by positive ions as well as deterioration of the isolation characteristic due to re-adhesion of sputter particles.

In addition, an image display device according to the present invention includes either a deflection current sensing circuit that drives an RGB output circuit or RGB preamplifier only when the deflection current flowing from horizontal/vertical deflection output circuits to the deflecting yoke is sufficient to enable the electron beam to adequately scan the screen; or a system control circuit that, after the main power source of the device is turned on, drives the horizontal/vertical deflection output circuit and supplies a deflection current to the deflecting yoke, and, when a sufficient deflecting current is flowing to enable the electron beam to adequately scan the screen, drives an RGB output circuit or an RGB pre-amplifier.

The above and other objects, features, and advantages of the present invention will become apparent from the following description with references to the accompanying drawings which illustrate examples of the present invention.

BRIEF DESCRIPTION OF THE DRAWINGS

FIG. 5 is a block diagram showing the key elements of an image display device according to the first embodiment the present invention; and FIG. 6 is a block diagram showing the key elements of an image display device according to the second embodiment of the present invention.

DETAILED DESCRIPTION OF THE PREFERRED EMBODIMENTS

Figure 1:
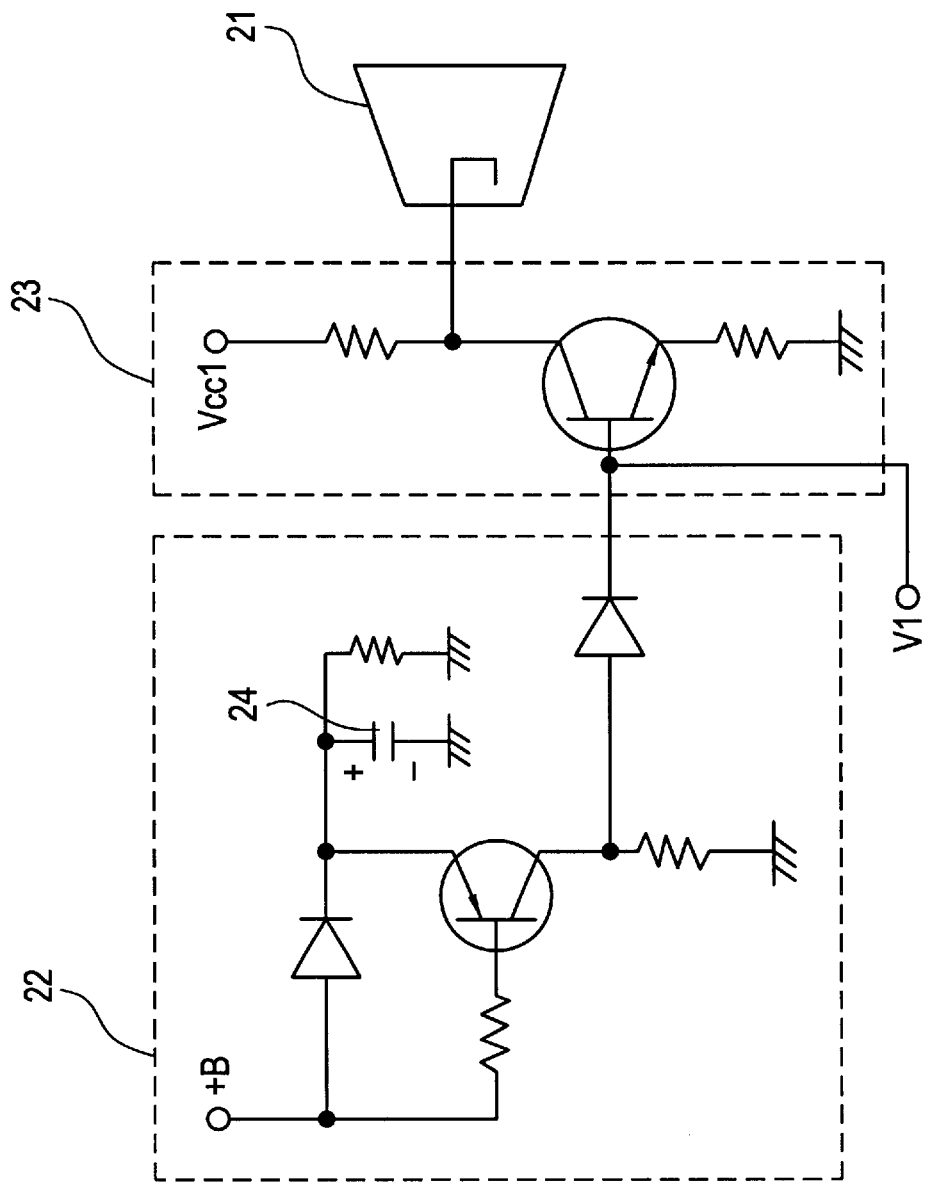
FIG. 1 is a circuit diagram showing a spot-killer circuit of the prior art.
Figure 2:
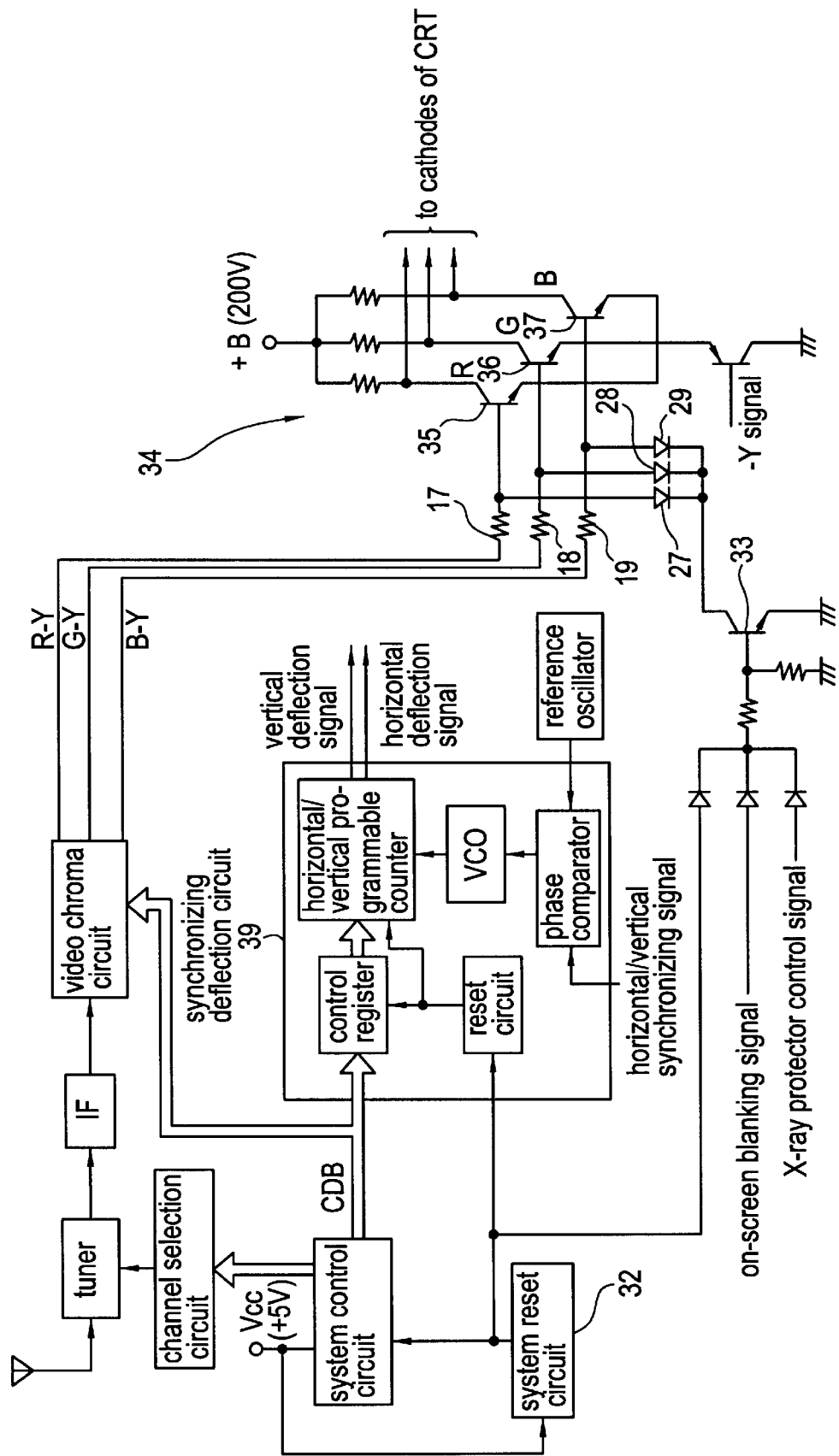
FIG. 2 is a block diagram showing the key elements of a television receiver of the prior art.

Referring to FIG. 5, the image display device of the first embodiment of the present invention comprises: cathode ray tube 1 having deflecting yoke 2 and screen 3, RGB output circuit 4, horizontal/vertical deflection output circuit 5, grid power source 6, anode power source 7, deflection current sensing circuit 8, RGB preamplifier 10, synchronizing signal processing circuit 11, and other circuits not shown.

Figure 4:
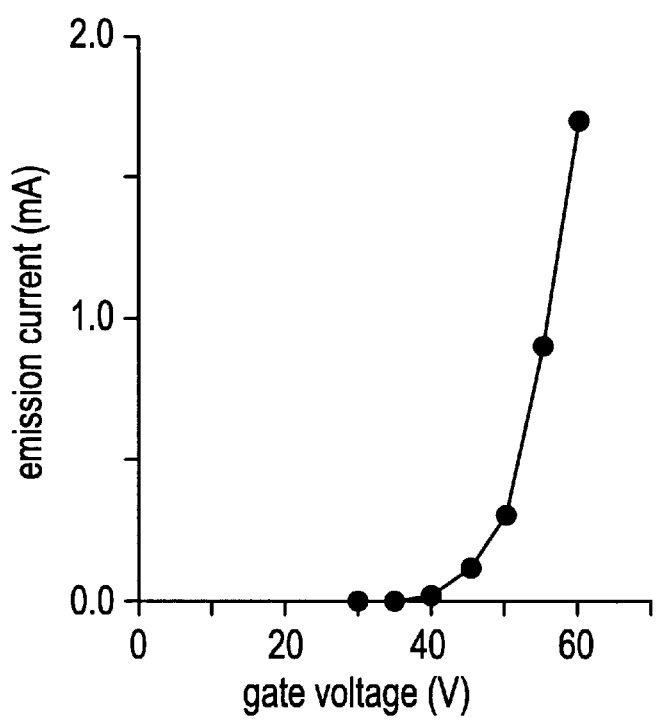
FIG. 4 shows an example of the current-voltage characteristic of a field emission cold cathode.

First, explanation will be presented regarding the basic structure and operation of an image display device that employs cathode ray tube 1 having a field emission cold cathode. Electron emission is brought about by supplying drive signals corresponding to image input signals to each of the RGB electron sources from RGB output circuit 4. In the case of driving a cathode ray tube incorporating a field emission cold cathodes having the current-voltage characteristic shown in FIG. 4, if the maximum current is, for example, 1 mA, a voltage modulated by amplitude is outputted from RGB output circuit 4 from a gate voltage of 35 V at which electron emission begins up to 55 V at which the emission current of 1 mA is obtained; and electron emission is brought about by applying this voltage between each of the emitter electrodes and gate electrodes of each of the RGB field emission cold cathodes. The emitted electrons are focused and accelerated by a grid (not shown) arranged in front of the electron source and voltage impressed by grid power source 6 to form an electron beam. The electron beam is deflected in horizontal and vertical directions by magnetic fields brought about by supplying horizontal and vertical deflection currents corresponding to image input signals from each of horizontal/ vertical deflection output circuit 5 to deflecting yoke 2 arranged outside cathode ray tube 1, and caused to scan a screen 3 to which fluorescent material has been applied. A voltage of about 20 KV is applied to screen 3 by anode power source 7 and the fluorescent material, excited by the electron beam, emits light to display an image. Here, RGB output circuit 4 does not output drive signals unconditionally. Rather, the device is constructed such that the deflection current is sensed by deflection current sensing circuit 8, and RGB output circuit 4 is driven only when a deflection current flows from horizontal/vertical deflection output circuit 5 to deflection yoke 2 that is sufficient to cause the electron beam to scan screen 3. For example, deflection current sensing circuit 8 integrates the deflection waveform and senses the integral value level.

Explanation is next presented regarding the operation from turning on the main power supply of the image display device until a steady state is attained. When the main power supply of the device is turned on, each component is supplied with power and the circuits begin to operate, but in a case in which deflection current sensing circuit 8 does not control RGB output circuit 4, the field emission cold cathode begins electron emission immediately upon voltage input. In contrast, the rise of horizontal/vertical deflection circuit 5 due to inductance of a coil until a sufficient steady magnetic field distribution is attained requires an interval of about one or two seconds. During these seconds, the electron beam undergoes either no deflection or insufficient deflection and therefore is irradiated and focused on one point or a minute region in the center of screen 3, causing damage to the fluorescent layer. The use of a hot cathode, which requires time for the rise in temperature, does not entail this problem.

In a case in which deflection current sensing circuit 8 exercises control over RGB output circuit 4, drive signals are not outputted to field emission cold cathode until horizontal/vertical deflection output circuit 5 has risen sufficiently, the electron beam is therefore not focused on any particular region of the screen, and damage to the fluorescent layer can be prevented.

In addition, residual gas molecules are present inside cathode ray tube 1, and gas adsorbed on the screen surface is also desorbed by irradiation of screen 3 by the electron beam. Irradiation of these gas molecules by the electron beam brings about ionization of the gas molecules and the generation of positive ions. In a state in which the electron beam is not deflected, the electron beam follows a direct line path, and the positive ions follow the same path in the opposite direction, and therefore reach and bombard the field emission cold cathode. The positive ions that bombard the field emission cold cathode cause sputtering at the tips of the emitter electrodes, thereby dulling the tips and degrading the electron emission characteristic. Re-adhesion of the sputtered material may also create leak paths between the emitter electrodes and gate electrodes that degrade the isolation characteristic and shorten the life of the device. In a steady operating state in which the electron beam is being deflected, however, the electrons and positive ions follow differing paths due to the difference in their mass, and virtually no positive ions reach the electron source.

As the judgment standard used in deflection current sensing circuit 8 of the present embodiment for determining whether or not to drive the RGB output circuit, the amplitude of the deflection current does not necessarily need to attain 100% that of the steady state. A sufficient effect can be achieved with a lower amplitude, such as 70 to 80% or greater.

Although deflection current sensing circuit 8 of the present embodiment is constructed so as to control RGB output circuit 4, an equivalent effect can be obtained by a construction in which deflection current sensing circuit 8 controls RGB pre-amp 10.

Figure 3:
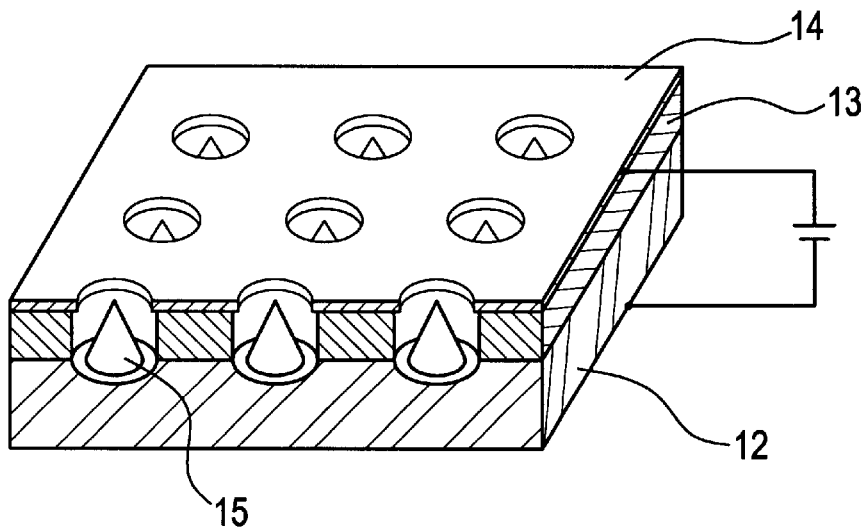
FIG. 3 is a partial perspective view showing the element structures of a field emission cold cathode.

The present embodiment can be applied to various types of field emission cold cathodes without limitation to any specific type. For example, in the field emission cold cathode, emitter electrodes 15 may be of various known forms including the "spin-type" such as shown in FIG. 3 which is formed by deposition using a process such as vacuum deposition, what is commonly called the "vertical type" in which protruding electrodes are formed by etching a silicon substrate, or what is commonly called the "horizontal type" which is formed by patterning a film by photolithography and etching.

Referring to FIG. 6, the image display device according to the second embodiment of the present invention is equivalent to the first embodiment shown in FIG. 5 with the exception that system control circuit 9 takes the place of deflection current sensing circuit 8.

Most image display devices for work stations or personal computers perform display by automatically following various types of image signals (signals having different combinations of horizontal/vertical synchronizing frequency). This type of image display device incorporates a microcomputer within the device to perform signal processing or system control. In the present embodiment, the RGB output circuit 4, grid power source 6, horizontal/vertical deflection output circuit 5, and anode power source 7 which are necessary for driving the cathode ray tube are connected in the same way as in the first embodiment. However, the construction is such that the operation and output signals of each of these drive circuits can be controlled by signals from system control circuit 9, which includes a microcomputer.

Explanation will next be presented regarding operation from the time the main power source of the image display device is turned on until a stationary operation state is attained. When the main power source of the device is turned on, power is supplied to each component beginning with system control circuit 9, but each of the drive circuits at this point is in a stand-by state and drive signals are not outputted to cathode ray tube 1. Next, a deflection current is supplied to deflection yoke 2 from horizontal/vertical deflection output circuit 5 in accordance with a signal from system control circuit 9. At a time differential of several seconds (for example, 2–3 seconds), RGB output circuit 4 begins to output a drive signal in accordance with a signal from system control circuit 9, thereby bringing about electron emission and the beginning of image display.

Electron emission thus begins at a reliable time differential following the start of the deflection current flow, and as in the first embodiment, damage to the fluorescent layer can therefore be prevented and the adverse influence to the electron source caused by positive ion bombardment can also be suppressed.

In the first and second embodiments, explanation has been presented regarding image display devices that incorporate a field emission cold cathode as a quick-action electron source, but it goes without saying that an equivalent effect can be obtained in image display devices incorporating cold cathodes of the tunnel type such as an MIM (metal-insulator-metal) structure or an MIS (metal-insulator-semiconductor) structure, of the surface conductor type, of the PN junction type, or of the photo-electric emission type.

In the first and second embodiments, moreover, explanation has been presented regarding devices that employ a cathode ray tube as the image display device, but the present invention may also be applied and an equivalent effect obtained using other displays in which an electron beam is deflected and scanned, such as a surface display of the electrostatic deflection type.

While preferred embodiments of the present invention have been described using specific terms, such -description is for illustrative purposes only, and it is to be understood that changes and variations may be made without departing from the spirit or scope of the following claims.

What is claimed is:

1. An image-casting control method for an image display device that incorporates a quick-action electron source comprising:

turning on the main power source of said image display device;

detecting that an electron beam deflection system has reached a steady operating state; and delaying the supply of drive signals corresponding to image input signals, during initial start up of said device, until said electron beam deflection system has reached a steady operating state.

2. A method according to claim 1 wherein the detection that said electron beam deflection system has reached a steady operating state is performed by detecting that sufficient deflection current is flowing to a deflection yoke to cause adequate scanning of the screen by an electron beam.

3. An image display device incorporating a quick-action electron source, comprising:

an RGB output circuit that outputs drive signals corresponding to image input signals to each of RGB electron sources;

an RGB pre-amplifier that amplifies RGB image input signals and outputs to said RGB output circuit;

a horizontal/vertical deflection output circuit; and a deflection current sensing circuit that drives said RGB output circuit or said RGB pre-amplifier only upon detecting that sufficient deflection current is flowing from said horizontal/vertical deflection output circuit to a deflecting yoke to enable an electron beam to adequately scan a screen;

wherein the supply of said drive signals to said RGB electron sources is delayed, during initial start up of said device, until said sufficient deflection current is detected.

4. An image display device according to claim 3 wherein said quick-action electron source is a cold cathode.

5. An image display device according to claim 4 wherein said cold cathode is any of a field emission-type, tunnel-type, surface conduction-type, PN junction-type, and optical pump-type cold cathode.

6. An image display device incorporating a quick-action electron source, comprising:

an RGB output circuit that outputs device signals corresponding to image input signals to each of RGB electron sources;

an RGB pre-amplifier that amplifies RGB image input signals and outputs to said RGB output circuit;

a horizontal/vertical deflection output circuit; and a system control circuit that, after the main power source of the device is turned on, drives said horizontal/vertical output circuit and supplies a deflection current to a deflecting yoke, and, only when a sufficient deflection current is flowing to enable an electron beam to adequately scan a screen, drives said RGB output circuit or said RGB pre-amplifier;

wherein the supply of said drive signals to said RGB electron sources is delayed, during initial start up of said device, until said sufficient deflection current is flowing.

7. An image display device according to claim 6 wherein said quick-action electron source is a cold cathode.

8. An image display device according to claim 7 wherein said cold cathode is any of a field emission-type, tunnel-type, surface conduction-type, PN junction-type, and optical pump-type cold cathode.

9. An image-casting control method for an image display device that incorporates a quick-action electron source comprising:

turning on the main power source of said image display device;

detecting that an electron beam deflection system has reached a steady operating state; and delaying the supply of drive signals corresponding to image input signals, during initial start up of said device, until said electron beam deflection system has reached a steady operating state;

wherein the detection that said electron beam deflection system has reached a steady operating state is performed by detecting that the amplitude of deflection current flowing to a deflection yoke is approximately equal to or greater than seventy percent of said steady operating state.

* * * * *